Dec. 23, 1958　　　　E. A. FUGLIE　　　2,865,150
ROTARY CRANKSHAFT GRINDER
Filed Oct. 31, 1956
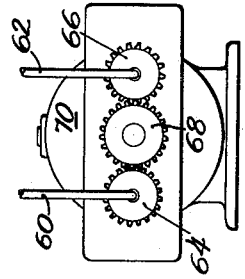
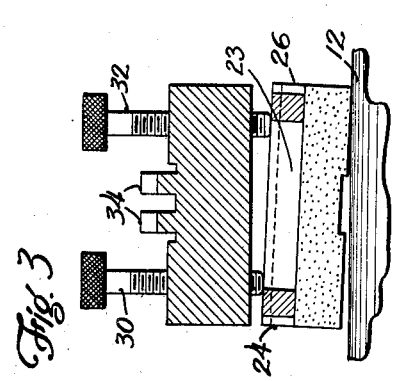
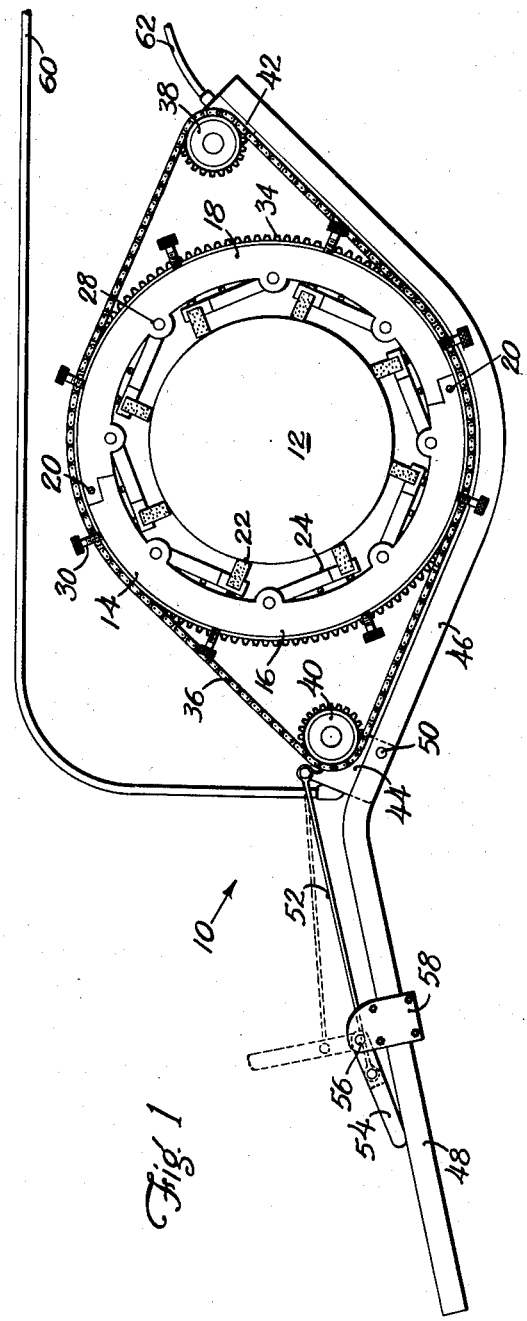
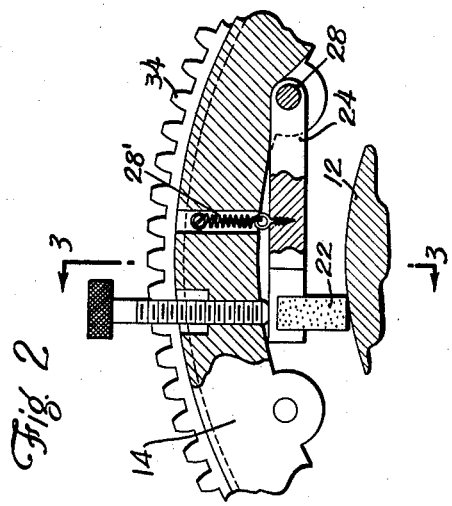
INVENTOR.
Elmer A. Fuglie
BY Whiteley and Caine
Attorneys

United States Patent Office 2,865,150
Patented Dec. 23, 1958

2,865,150

ROTARY CRANKSHAFT GRINDER

Elmer A. Fuglie, Winona, Minn., assignor to Winona Tool Manufacturing Company, Winona, Minn., a partnership Application October 31, 1956, Serial No. 619,438

6 Claims. (Cl. 51—241)

This invention relates to improvements in a rotary grinding device. In general, the invention pertains to a device for grinding relatively large cylindrical surfaces, such as the connecting rod bearings on the crankshaft of a large diesel engine or the like.

The grinding of connecting rod bearings of automotive engine crankshafts is a relatively well developed art, but the methods employed for the relatively small bearings of automotive engines are not applicable to much larger crankshafts customarily used in large diesel engines. In the case of automotive engine crankshafts, the crankshaft may be removed from the engine and mounted in a lathe as disclosed in U. S. Patents 2,390,933 and 2,391,406 assigned to the present assignee, or the crankshaft may be retained within the engine and its bearings may be ground by grinding devices supported by the engine or portions thereof as disclosed in U. S. Patents 2,247,344, 2,298,055 and 2,629,213, also assigned to the present assignee. In either of these disclosures a small cylindrical grinding wheel is supported transversely to the bearing and the bearing surfaces ground by the flat outer surface of the wheel. It is essential in these prior disclosures that the crankshaft itself be slowly rotated during this operation to axially rotate the bearing, and the grinding wheel is held in contact with a tangential portion of the bearing. With larger engines, rotation of the crankshaft presents power problems, and therefore, the methods applicable to the automotive engine do not apply.

In the present invention, I have provided a rotary device for grinding large crankshaft bearings wherein the bearing remains stationary and the grinder rotates relative to the bearing. The device consists of an annular member composed of a pair of separable parts adapted to be assembled about the bearings so as to circumscribe the bearing. The annular member contains within its periphery a multiplicity of individual grinding stones, each more or less rectangular in configuration supported for independent adjustment relative to the work piece. The annular member is rotated by a flexible driven element in the form of a chain that circumscribes the annular member, but extends on opposite lateral sides thereof so that two opposite portions of the chain engage the member. A pair of synchronously driven members are connected to the chain on opposite sides of the annular member, and by being so disposed the torque is evenly distributed to the annular member and the grinding stones so that it evenly grinds the surface of the bearing or work piece.

An object of the invention is to provide a rotary device for grinding relatively large crankshaft bearings and under conditions where the crankshaft cannot be rotated.

Another object is to provide a rotary grinder composed of an annular member that circumscribes the work piece and contains a multiplicity of individually adjustable transversely disposed grinding elements capable of grinding the bearing to a true cylinder and also removing a taper from the bearing.

Another object is to provide a rotary grinder composed of an annular member floatingly supported within a circumscribing driven member which in turn is driven by a pair of driving members disposed on opposite sides of the annular member so as to evenly distribute the torque of the grinding elements carried within the annular member to the work piece.

A further object is to provide a rotary grinder composed of an annular member containing a multiplicity of individual grinding stones each of which is adjustable relative to the work piece, and in which the annular member is driven by a pair of synchronous driving members disposed on opposite sides of the annular member so as to evenly distribute the torque.

Other and further objects may become apparent from the following specification and claims, and in the appended drawing in which:

Fig. 1 is a side elevation of a rotary grinding device forming the present invention;

Fig. 2 is a fragmentary disclosure of a part of the structure shown in Fig. 1 disclosing a portion of the means for individually adjusting the grinding elements relative to a work piece;

Fig. 3 is a sectional view taken on the lines 3—3 of Fig. 2; and,

Fig. 4 discloses a synchronous driving means used in connection with the structure disclosed in Fig. 1.

Having reference to the several figures of the drawing, the invention will be described in detail.

General reference numeral 10 indicates in its entirety a rotary grinding device primarily intended to grind or refinish crankshaft connecting rod bearings of a relatively large crankshaft such as may be used in a large diesel engine. The work piece or crankshaft bearing is indicated by reference character 12. The device 10 consists of an annular member indicated generally by reference character 14, composed of a pair of semicircular portions 16 and 18 bolted to each other as indicated at 20. Within its interior the annular member 14 carries a multiplicity of rectangular bonded abrasive grinding stones indicated severally by reference numeral 22. Each of the stones 22 is supported by a plate 23 carried on the outer ends of a pair of bars 24, 26, see Fig. 3, which in turn are pivotally supported on the inner surface of member 14 by means of a pivot pin 28. As best seen in Figs. 2 and 3, each of the bars 24, 26 is biased in the direction of the annular member 14 by a coil spring 28', and these bars are made adjustable with respect the work piece 12 by means of individual set screws or adjusting bolts 30, 32.

On its outer periphery, the annular member 14 is formed with integral gear teeth 34. Loosely extending about the periphery of the annular member 14 is a flexible driven member 36 composed of a link chain which engages the gear teeth 34. The driven member 36 is engaged by a pair of pinion gears 38 and 40 each forming part of speed reduction gear devices 42, 44. The reduction gear devices 42 and 44 are supported on an arcuate portion 46 of a supporting member 48 used to position and move the device relative to the work piece 12.

The tautness of chain 36 is controlled by the pivotal movement of speed reduction device 44 on a pivot 50, under the control of a link 52 joining the speed reduction device 44 to a lever 54 that is pivoted for over-center movement on a pivot 56 of a frame 58 secured to the supporting member 48.

The speed reduction or transmission devices 42, 44 are driven by cables 60, 62 extending from a pair of gears 64, 66 synchronously driven by a center gear 68 on a motor 70.

Having reference to the several views of the drawing, the operation of the device will now be explained. The supporting member 48 is used to position the device 10 relative to a bearing 12 forming a part of a large crankshaft or the like. To assemble the device 14 about a bearing, lever 54 is rotated to its dotted line position permitting the reduction gear device 44 to rotate clockwise on pivot 50 to slacken the chain 36. The semicircular parts 16 and 18 are then assembled about the work piece 12 and secured to each other by means of the fastening elements 20. When this is done, lever 54 is rotated to its full line position to tighten chain 36, whence motor 70 is started and through the synchronous gear arrangement, the pinions 38 and 40 simultaneously drive member 14 about the work piece creating equal opposite forces on the upper and lower sides of the work piece.

As can be readily seen in the drawing, member 14 is floatingly supported by the chain 36 on the two pinions 38 and 40 and therefore the member 14 is caused to rotate about a true center. To grind the surface of the bearing, the thumb screws are manually adjusted to bring the several stones into contact with the periphery of the bearing. In Fig. 3 is illustrated a condition where the bearing has a taper extending from right to left. When this condition exists the line of thumb screws on the right side of the gear teeth 34 are screwed down to a greater degree causing tilting of the stones 22 to the right. This action will cause extra wear on the right sides of the stones, but at the appropriate time the annular member can be disassembled and rotated so as to reverse the position of the stones. Since the bearing or work piece may have uneven surfaces, after some use the stones may be unevenly worn, but they can be trued by a device, not shown, involving a diamond cutter which can be mounted in the axis of the annular member.

A primary advantage of the invention resides in the provision of a relatively simple device for grinding large crankshaft bearings, for it will be recognized that a crankshaft bearing cannot be treated as any simple shaft which can be mounted in a lathe or a grinder used for rollers and the like.

Another advantage resides in the support of the annular member within the upper and lower stretches of the chain drive and with the disposition of the driving members on either side of the annular member, since this action produces rotation about a true center.

A further advantage resides in the provision of the adjustment of the abrasive pieces, since this permits removal of tapered surfaces on the bearing.

My invention is not limited to the exact disclosure of the drawings, but is defined in the terms of the appended claims.

I claim:

1. A rotary grinder, comprising an annular member adapted to circumscribe a cylindrical work piece, a multiplicity of individual grinding elements carried within the interior of said annular member in spaced circumferential relationship with each other, a flexible driving member circumscribing said annular member and engaging a portion of the periphery of said member and a pair of synchronous driving members each engaging said flexible member on opposite sides of said annular member providing a balanced torque on said member to evenly grind said work piece.

2. A rotary grinder, comprising an annular member adapted to circumscribe a cylindrical work piece, a multiplicity of individual abrading elements carried in spaced circumferential relationship with each other within the periphery of said annular member, a continuous flexible member of substantially greater circumference than said annular member extending about the periphery of said annular member, and a pair of synchronous driving members disposed on opposite sides of said annular member and each operatively engaging said flexible member and holding opposed portions of said flexible member in engagement with diametrically opposed portions of said annular member maintaining a balanced torque on the opposite sides of said annular member and between said abrading elements and the work piece.

3. A rotary grinder, comprising an annular member adapted to circumscribe a cylindrical work piece, a multiplicity of links pivotally mounted in spaced circumferential relation to each other within the inner periphery of said member and whose outer ends are movable relative to the axis of said member, means carried by said annular member cooperating with each of said links to control the movement of the outer ends thereof with respect the axis of said member, a rectangular block of bonded abrasive material carried on the outer end of each of said links adapted to abrade the periphery of the work piece, and means operatively connected to said annular member for rotating the same relative to the periphery of the work piece.

4. A rotary grinder, comprising an annular member adapted to circumscribe a cylindrical work piece, a multiplicity of pairs of links pivotally mounted within the periphery of said annular member, a rectangular block of bonded abrasive material secured to the outer end of each pair of links, means for rotating said annular member relative to the work piece, and means for independently adjusting the links of each pair of links to move one end of each of said rectangular blocks relative to the work piece to remove a taper on said work piece.

5. A rotary crankshaft bearing grinder, comprising an annular member formed with a continuous set of gear teeth circumscribing the outer surface thereof, a multiplicity of individual abrading elements carried in spaced circumferential relationship with each other within the periphery of said annular member, a continuous chain of substantially greater circumference than said annular member extending about the periphery of said member and engaging diametrically opposed portions of the gear teeth on said member, a semi-circular supporting member, a pair of driven pinions carried by said supporting member and engaging said chain to hold the latter in engagement with the gear teeth on said annular member, and means for moving one of said pinions relative to said supporting member to adjust the tension on said chain.

6. A rotary grinder, comprising an annular member adapted to circumscribe a cylindrical work piece, a multiplicity of bonded abrasive blocks mounted in spaced circumferential relation to each other within the inner periphery of said member for abrading the outer surface of the work piece, means carried by said member and co-acting with each of said blocks for adjusting the position of each block relative to said work piece, said annular member formed with a continuous set of gear teeth circumscribing the outer surface thereof, a continuous chain of greater circumference than the circumference of said annular member circumscribing said annular member, a pair of pinion gears disposed on either side of said annular member and engaging said chain and acting to hold diametrically opposed portions of the chain in engagement with diametrically opposed portions of the gear teeth on said annular member, and means for synchronizingly driving said pinion gears to maintain a balanced torque on said annular member.

References Cited in the file of this patent

UNITED STATES PATENTS

| 1,877,338 | Kottlowski | Sept. 13, 1932 |
| 2,249,388 | Kline | July 15, 1941 |